United States Patent [19]

Chevroulet

[11] Patent Number: 5,369,837
[45] Date of Patent: Dec. 6, 1994

[54] WINDSHIELD WIPER ARRANGEMENT WITH AN ARM OF VARIABLE ACTIVE LENGTH

[75] Inventor: Tristan Chevroulet, Neuchatel, Switzerland

[73] Assignee: SMH Management Services AG, Biel, Switzerland

[21] Appl. No.: 180,461

[22] Filed: Jan. 12, 1994

Related U.S. Application Data

[62] Division of Ser. No. 38,633, Mar. 29, 1993, abandoned.

[30] Foreign Application Priority Data

Apr. 21, 1992 [FR] France ................... 92 04975

[51] Int. Cl.⁵ .............................. B60S 1/36; B60S 1/26
[52] U.S. Cl. .................................. 15/250.21; 15/250.3; 74/104; 74/25
[58] Field of Search ........... 15/250.21, 250.23, 250.35, 15/250.29, 250.13, 250.39, 250.30; 74/89, 89.16, 89.21, 89.22, 104, 25

[56] References Cited

U.S. PATENT DOCUMENTS

3,831,220 8/1974 Gmeiner et al. ................ 15/250.21

FOREIGN PATENT DOCUMENTS

| | | |
|---|---|---|
| 2178683 | 10/1973 | France . |
| 2508399 | 12/1982 | France . |
| 2613302 | 10/1988 | France . |
| 2364427 | 7/1975 | Germany . |
| 2430163 | 1/1976 | Germany .......................... 15/250.21 |
| 3447438 | 5/1985 | Germany .......................... 15/250.21 |
| 3742635 | 10/1989 | Germany . |
| 854780 | 8/1981 | U.S.S.R. .......................... 15/250.21 |

Primary Examiner—David A. Scherbel
Assistant Examiner—Gary K. Graham
Attorney, Agent, or Firm—Pollock, Vande Sande & Priddy

[57] ABSTRACT

The invention concerns a windshield wiper arrangement including a windshield wiper arm (2) the active length of which varies in the course of the sweeping movement, characterized in that it includes: motor means including a first motor shaft (26) given a first alternating rotation motion and a second motor shaft (34) given a second alternating rotation motion, the amplitude of the alternating rotation of the second shaft (34) being greater than that of the first shaft; a crank (24) coupled for rotation onto the second motor shaft on the one hand, and on the other hand articulated onto said arm (2); an arm support element (6) coupled for rotation onto the first motor shaft (26); and coupling means between the support element (6) and the arm (2) permitting a translation motion of the arm (2) on said support element (6) in a direction substantially parallel to the longitudinal dimension of the arm (2).

3 Claims, 4 Drawing Sheets

WINDSHIELD WIPER ARRANGEMENT WITH AN ARM OF VARIABLE ACTIVE LENGTH

RELATED APPLICATION

This application is a division of Ser. No. 08/038,633 filed on Mar. 29, 1993, now abandoned.

TECHNICAL FIELD

The present invention concerns windshield wiper arrangements in general and, more specifically, a windshield wiper arrangement for automotive vehicles having at least one blade mounted on a sole principal arm, the active length of which varies in the course of the wiping movement.

BACKGROUND OF THE INVENTION

The utilization of a sole arm in windshield wiper arrangements is essential when it is necessary to reduce the cost of automobile equipment. Nevertheless, when a sole arm is employed, it is most often advisable to adapt the course of the arm in a manner such that the surface swept by the blade is the widest possible for the safety and comfort of the driver as well as the passengers. A large number of windshield wiper arrangements with a sole arm have already been proposed, among which there may be cited those described in the French patent Nr. 2 508 399 and in the German patent Nr. 37 42 635.

These arrangements are normally intended to be mounted in the center of the lower portion of the windshield and generally include a complex, indeed cumbersome and costly arrangement in order to assure work over a swept surface as wide as possible.

In the case of the French patent document, the windshield wiper arrangement includes a casing which encloses a transmission with gears and a crank and which is given the same movement of rotation as that of the arm of the windshield wiper. Such transmission system enables generating a complex motion of the arm in which motion such arm may in the course of its rotation pass through several values of length of which in particular two are maximum and three minimum.

In the case of the German patent document, the transmission system is still more complicated and this in oroer to permit the arm of the windshield wiper to effect a different trajectory as well in one sense of rotation as in the other.

Not only the complexity of these known systems raises the manufacturing and assembly costs, but it is generally accompanied by an increase in the moments of inertia of the arrangement which necessitates a more powerful driving motor and thus likewise more expensive.

The present invention thus has as its principal purpose to provide a windshield wiper arrangement which is particularly simple and economic.

The present invention also has as purpose to provide a windshield wiper arrangement with a sole arm for an automotive vehicle which assures a good swept surface by the arm of the windshield wiper and which is intended to be assembled in a position close to a lower corner of the windshield while presenting a reduced space requirement.

SUMMARY OF THE INVENTION

To this end, the invention has as its purpose a windshield wiper arrangement including a windshield wiper arm the active length of which varies in the course of the wiping movement. In conformity with the invention the windshield wiper arrangement includes:

- motor means including a first motor shaft given a first alternating rotation motion and a second motor shaft given a second alternating rotation motion, the amplitude of the alternating rotation of the second shaft being greater than that of the first shaft;
- a crank coupled for rotation onto the second motor shaft on the one hand, and on the other hand articulated onto said arm;
- an arm support element coupled for rotation onto the first motor shaft; and
- coupling means between the support element and the arm permitting a translation motion of the arm on said support element in a direction substantially parallel to the longitudinal dimension of the arm.

Thanks to these characteristics, there is provided a windshield wiper arrangement having a sole arm, the length of which varies in the course of the wiping movement, the arrangement presenting at the same time a small number of parts in motion and a structure of little complication. Thus, the assembly of this arrangement is easy and its space requirement is reduced.

According to a first embodiment of the invention, the coupling means between the support element and The arm comprise a slideway provided in the support element and in which slides a slidebar to which said arm is secured.

According to a second embodiment of the invention, the coupling means between the support element and the arm comprise a connecting piece which extends substantially in the prolongation of the arm and at one end of which the arm is secured and in that the connecting piece is provided with a longitudinal groove in which slides a pin fixed to the support element, the opposite end of the connecting piece being fixed for rotation onto said crank.

Other characteristics and advantages of the present invention will appear more clearly upon reading of the following description of several embodiments, said description being given by way of illustration and in connection with the attached drawings.

DESCRIPTION OF THE PREFERRED EMBODIMENTS

Figure 1:
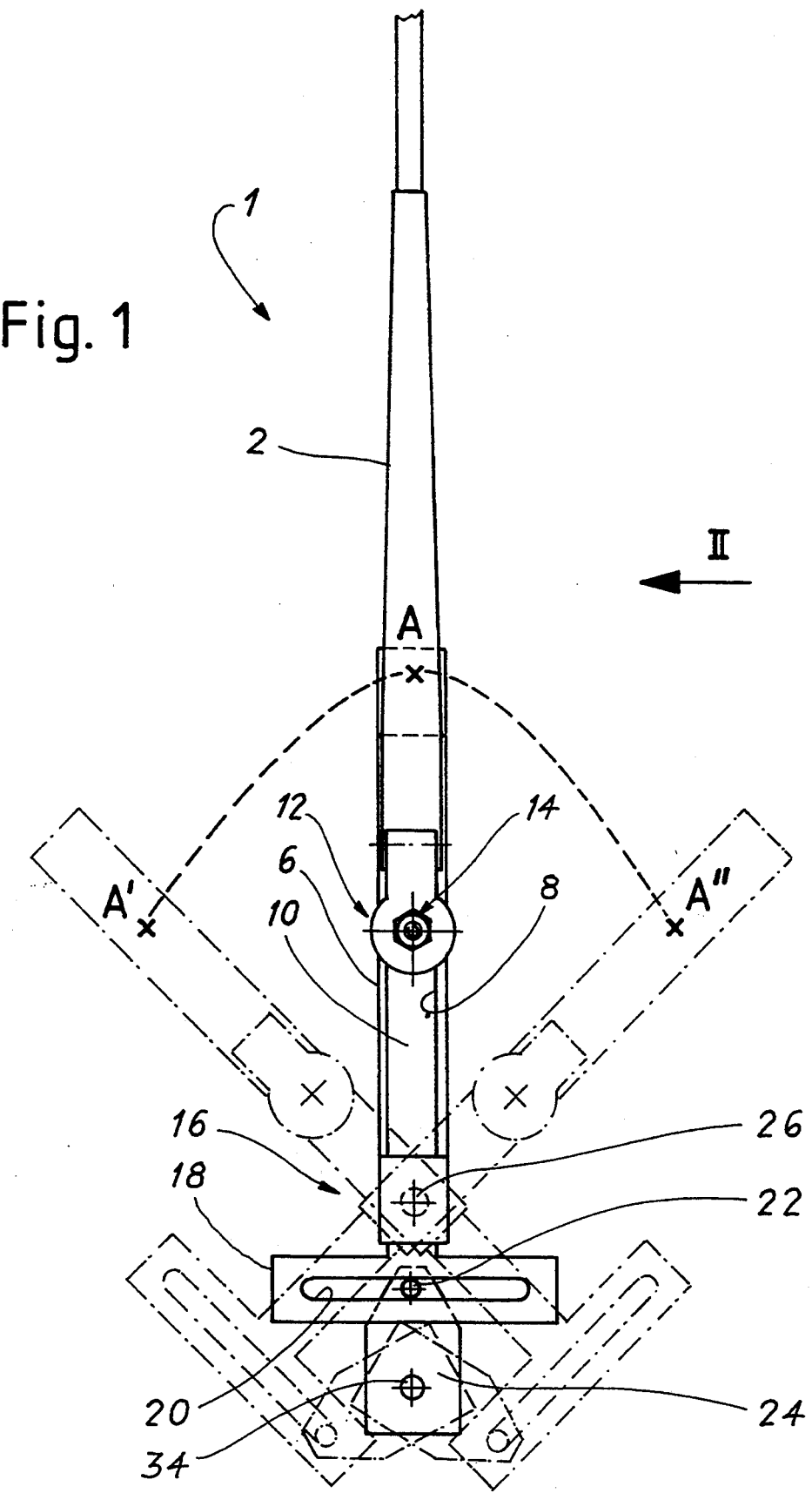
FIG. 1 shows schematically and partially a first embodiment of the windshield wiper arrangement according to the invention shown in different positions.

Referring initially to FIG. 1, there is seen a first embodiment of the windshield wiper arrangement according to the invention, designated by the general numerical reference 1.

Such arrangement 1 includes a windshield wiper arm 2 which is shown on FIG. 1 in two extreme positions (in broken outlines) as well as in a median position (in full lines). The windshield wiper arm 2, on which a blade 4 (partially shown on FIG. 2) is mounted in a standard manner, is connected to a support element 6 through coupling means described hereinafter.

Such coupling means comprise a slideway 8 provided in the support element 6 and in which can slide a slidebar 10, a first end 12 of which is fixed to arm 2 by means of a bolt 14. The slidebar 10 is maintained in the slideway 8 in a manner such that it may freely be translated and slide in the longitudinal axis of arm 2, such displacement being designated by the arrow on FIG. 2.

The slidebar 10 exhibits, at a second end 16, a portion 18 of oblong and rectilinear form. The oblong portion 18 extends perpendicularly to the longitudinal direction of the slidebar 10 and is provided with a slot 20 which is also of oblong form. Slot 20 receives a pin 22 fixed to the end of a crank 24.

According to a variant of the embodiment, not shown, the oblong portion 18 as well as slot 20 may exhibit a curved configuration the concavity of which is directed towards arm 2. It will be noted that this variant in particular permits diminishing in an advantageous manner the space requirement of the arrangement for an equal amplitude of the arm 2.

The support element 6 is driven in a manner which will be explained hereinafter in relationship with FIG. 2 according to an alternating rotation motion (between its two extreme positions shown in broken lines on FIG. 1) and around its geometrical rotation axis B. In the same manner, crank 24 is given an alternating rotation motion (between its two extreme positions also shown in broken outlines on FIG. 1) around its geometrical rotation axis C.

Crank 24 drives, thanks to its coupling with slidebar 10 through slot 20 and pin 22, the sliding of slidebar 10 in the slideway 8 of the support element 6.

The combined motion of rotation and translation of slidebar 10 to which arm 2 is secured, have as effect to permit the blade 4 to cover a surface adapted to the form of the windshield, in particular when the arrangement of the invention is assembled in a position close to a lower corner of such windshield.

FIG. 1 further shows in dashed outline the trajectory run over by a point A of the windshield wiper arm during its movement between its two extreme positions A' and A''. This trajectory shows that in the median position the arm of the windshield wiper exhibits a maximum extension while in its two extreme positions its extension is reduced to the minimum.

Figure 2:
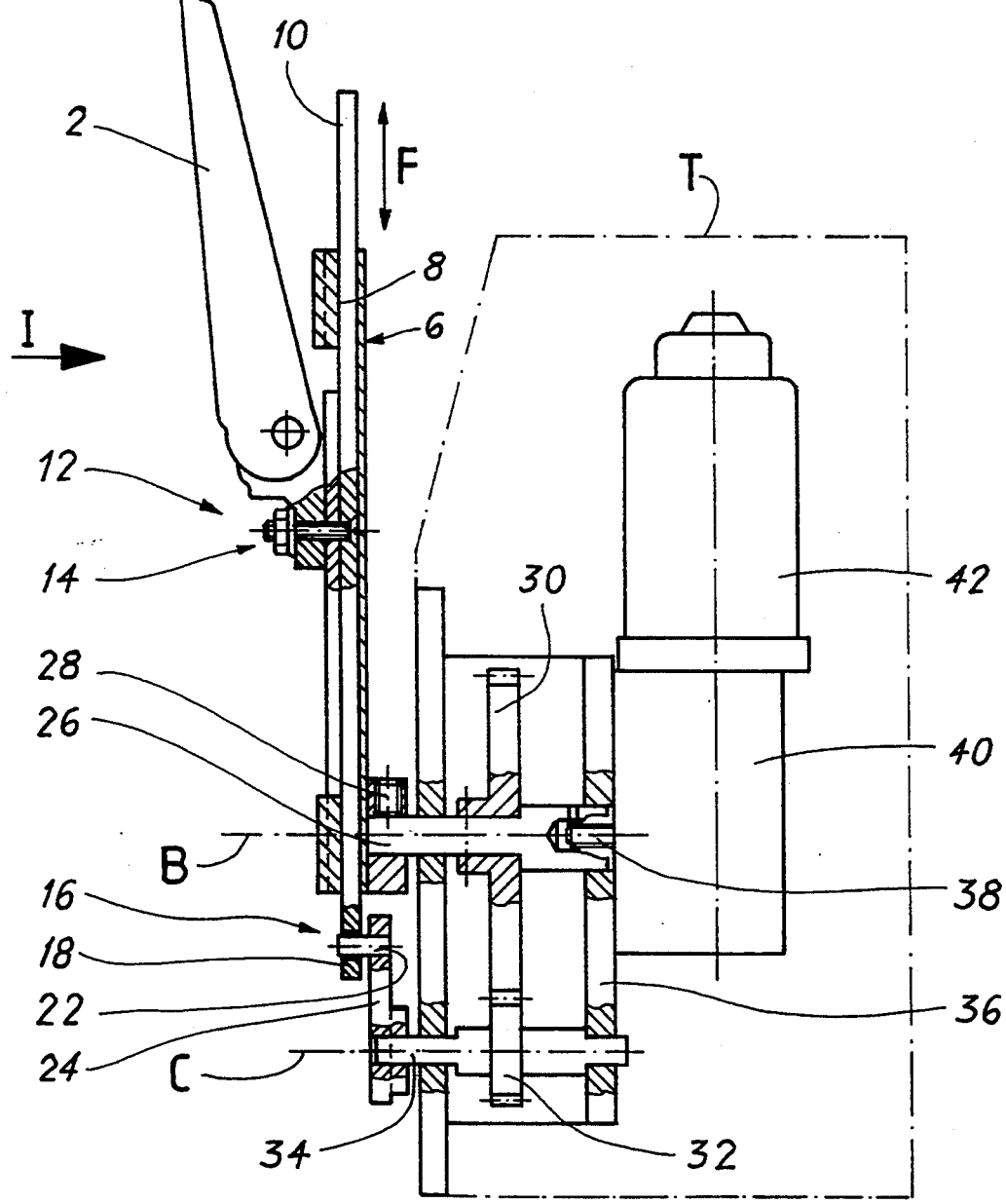
FIG. 2 is a side view of the windshield wiper arrangement of FIG. 1 and shows in cross-section the driving mechanism according to the invention.

FIG. 2 shows, in particular, the transmission elements enabling the alternating rotation motions of the slideway 8 and crank 24. The slideway 8 is fixed to a first motor shaft 26 by means of a screw 28. The motor shaft 26 supports a first toothed wheel 30 which meshes with a second toothed wheel 32 which is fixed to a second motor shaft 34 fixed to crank 24.

The gearing ratio is determined so as to permit the respective motions of slideway 10 and crank 24.

By way of example, for a bottoming out of windshield wiper arm 2 of ±45° and a bottoming out of the crank 24 of ±130°, the gearing ratio is 1:2.8.

The gearing formed of first and second toothed wheels 30 and 32 and of their respective motor shafts 26 and 34 is mounted in a casing 36 which may be fixed to the vehicle by appropriate means.

The motor shaft 26 is fixed to an output shaft 38 of a transmission case 40 which transforms the circular motion of an output shaft (not shown) of an electric motor 42 into an alternating rotation motion of given amplitude.

The fabrication of the transmission case 40 is sufficiently known to the person skilled in the art so that it has not been necessary to describe it further up until now; by way of example a simple connecting rod-crank is completely appropriate.

It will be noted that the assembly of the casing 36, transmission case 40 and electric motor 42 may be advantageously placed in a box symbolized by the broken outline T on the drawing.

Each of shafts 26 and 34 is mounted in the casing 36 in a standard manner by means of two bearings, not shown.

The toothed wheels are formed preferably of a hard plastic material resistant to wear and offering the advantage of providing a particularly silent gearing.

Figure 3:
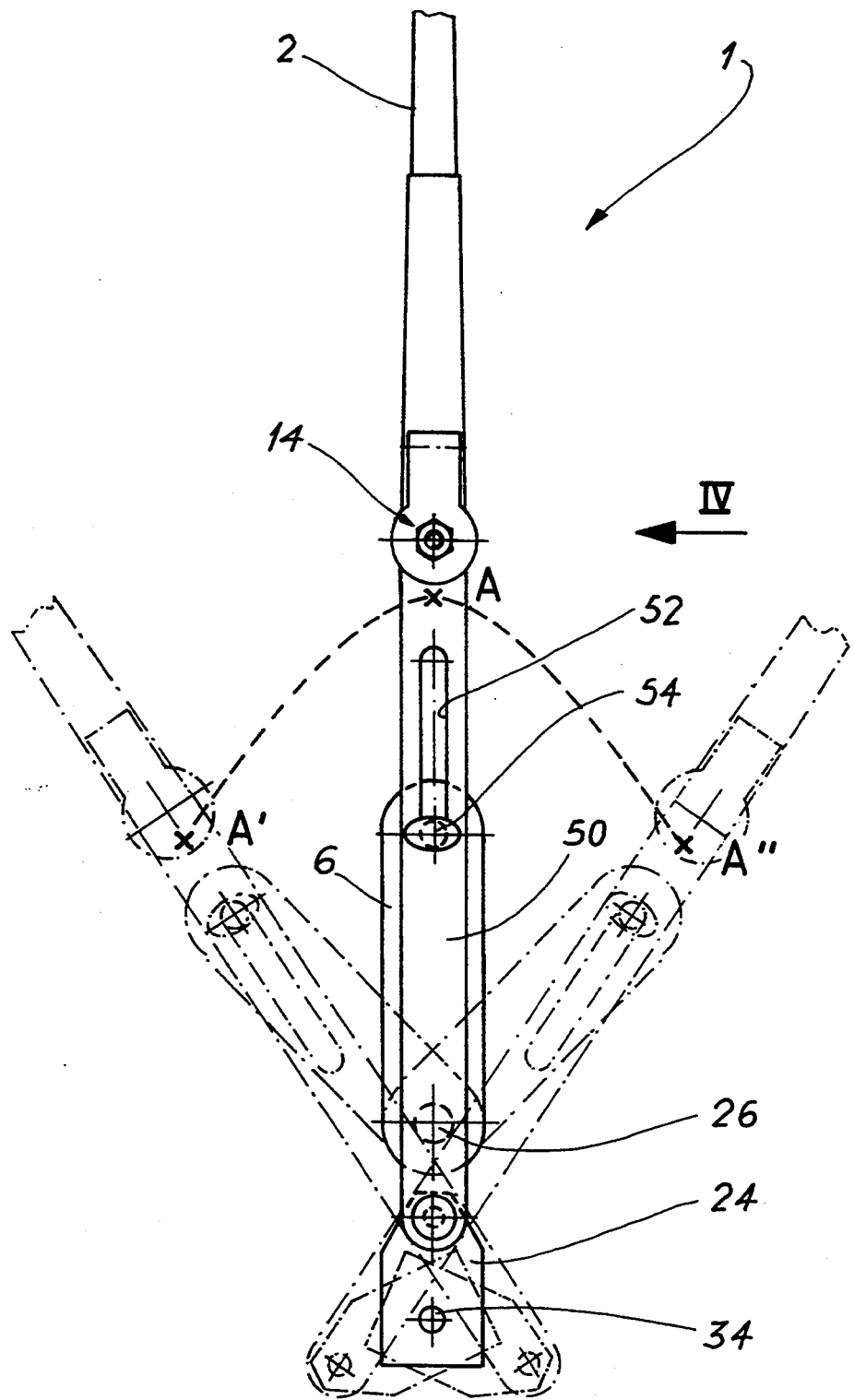
FIG. 3 shows schematically and partially a second embodiment of the windshield wiper arrangement according to the invention shown in different positions.
Figure 4:
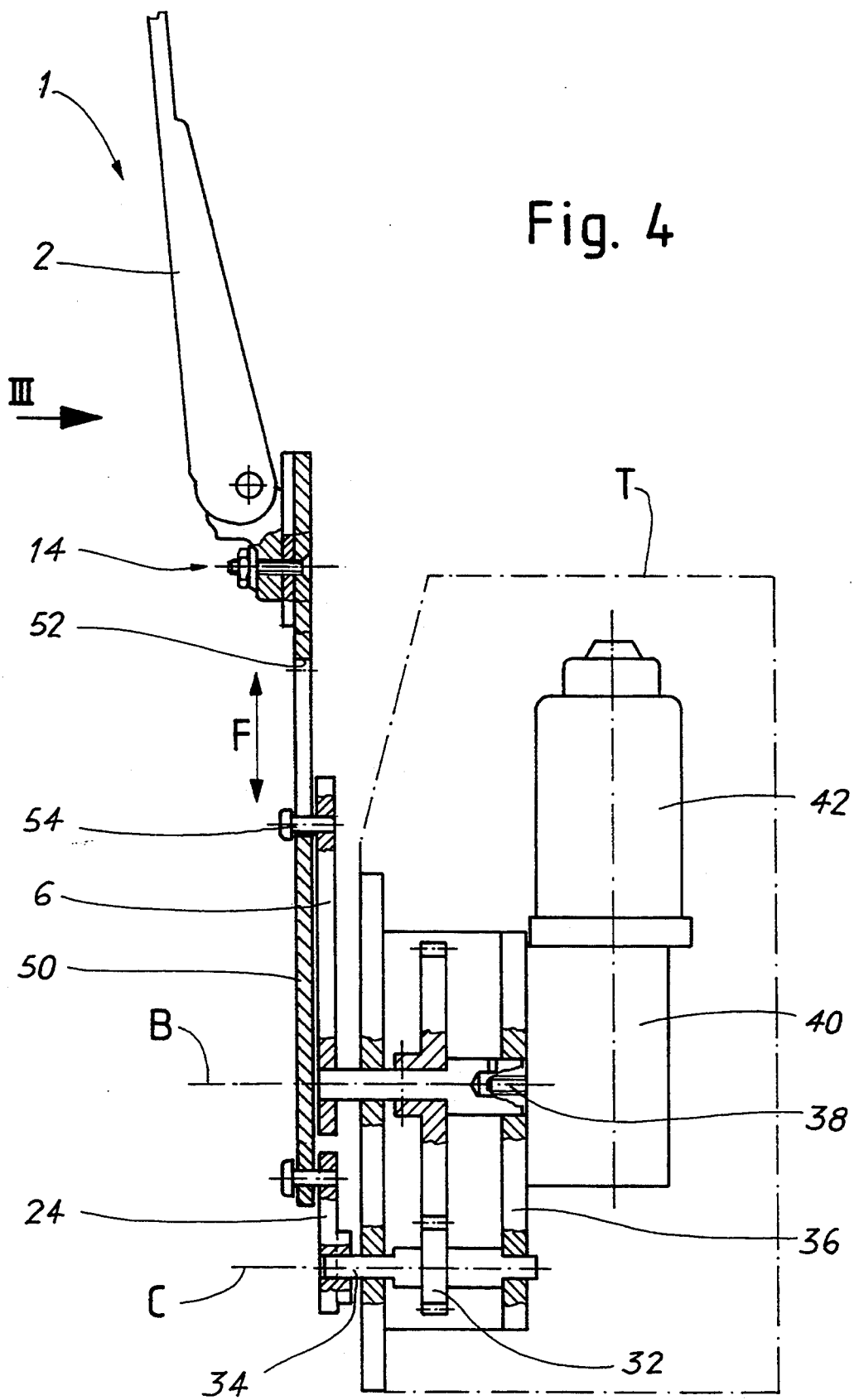
FIG. 4 is a side view of the windshield wiper arrangement of FIG. 3 and shows in cross-section the driving mechanism according to the invention.

Referring to FIGS. 3 and 4, there is seen a second embodiment of the windshield wiper arrangement according to the invention, in which the elements identical to those previously described have been designated by the same reference numerals.

While in the first embodiment, the coupling means between the support element 6 and the arm 2 comprise a slideway 8 and a slidebar 10 at one end of which there extends perpendicularly an oblong portion 18 provided with a slot 20, in the second embodiment the coupling means comprise a connecting piece 50 which extends in the prolongation of arm 2 and which is rigidly fixed by a first extremity to arm 2 and is fixed for rotation by its opposite extremity to crank 24. The connecting piece 50 comprises furthermore a slot 52 which extends longitudinally relative to piece 50 and in which may slide a pin 54 fixed to the support element 6.

In the example described, connecting piece 50 is fixed to arm 2 by means of bolt 14, but it can advantageously be integrally formed with arm 2.

It is clear that the invention which has just been described may undergo variants without departing from its principle, in particular in the first embodiment the articulation of the crank 24 and of the slidebar can be brought about in a different manner, for example with the help of an articulated arm which enables avoiding fabrication of the slotted oblong portion 18.

What is claimed is:

1. A windshield wiper arm arrangement comprising:
an elongated windshield wiper arm having a first end;
a first shaft arranged for a first alternating rotation motion having a first amplitude;
a second shaft arranged for a second alternating rotation motion having a second amplitude greater than said first amplitude;
a crank coupled for rotation onto said second shaft and having a free end;
an elongated connecting piece having a first end articulated onto said free end of said crank and a second end connected to said first end of said wiper arm, a longitudinal slot being provided between said first and second ends of said connecting piece;
an arm support element having a first end connected to said first shaft and a second end having a pin being slidably received in said slot; and,
motor means coupled with said shafts to thereby impart to said wiper arm an alternating sweeping movement wherein an active length of said wiper arm arrangement between said pin and said first end of said wiper arm varies during said sweeping movement.

2. A windshield wiper arm arrangement according to claim 1, wherein the motor means further includes gearing formed by at least one first toothed wheel and a second toothed wheel respectively mounted on said first and said second shafts.

3. A windshield wiper arm arrangement according to claim 2, wherein one of said toothed wheels is coupled to a transmission system for producing an alternating rotation movement from a continuous rotation movement of an output shaft of an electric motor.

* * * * *